Oct. 19, 1926.

L. M. WOOD

LIFTING MECHANISM FOR VALVE SPRINGS

Filed Jan. 5, 1924   3 Sheets-Sheet 1

1,603,733

INVENTOR
Louis M. Wood
BY
ATTORNEYS

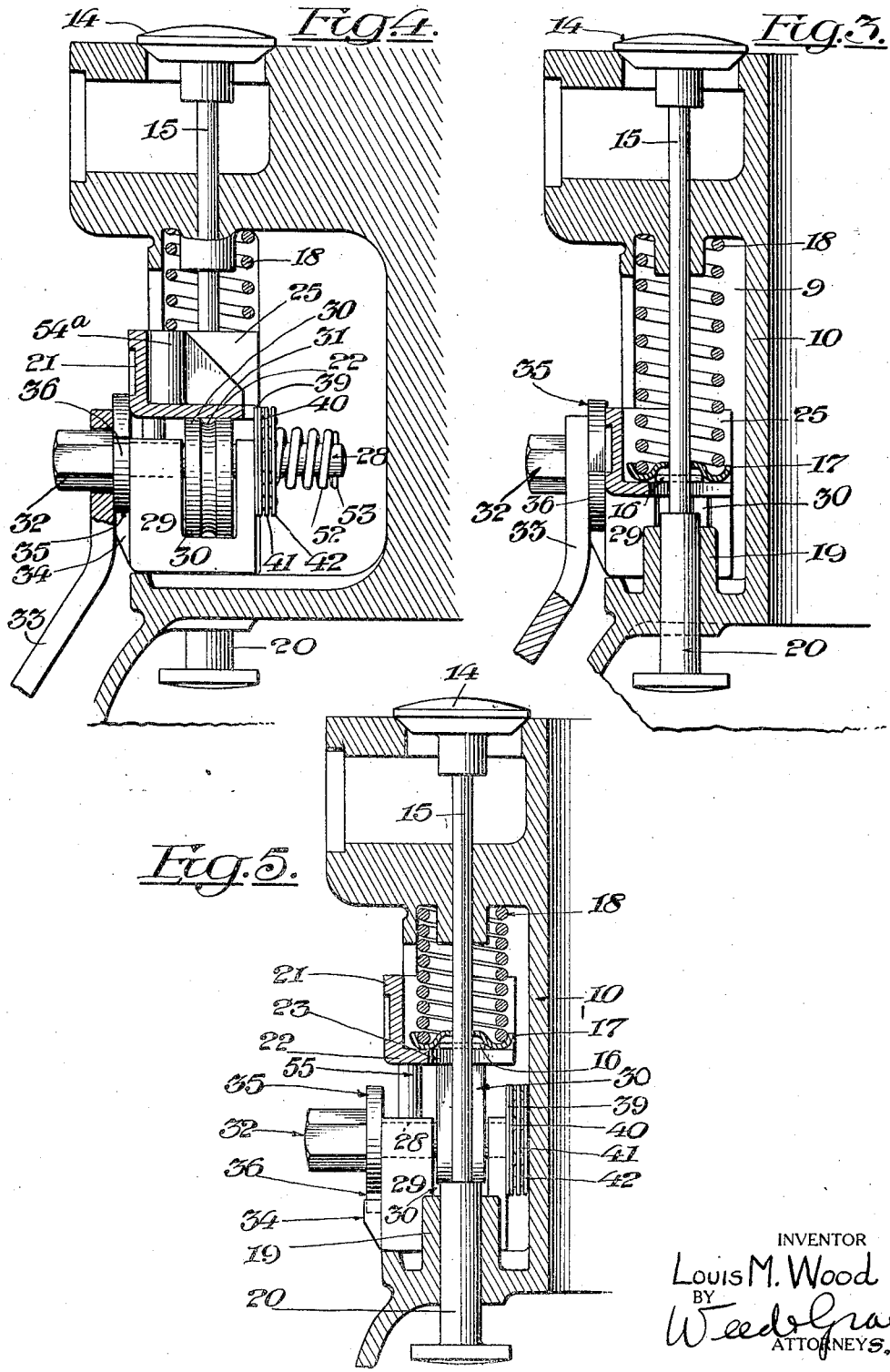

Oct. 19, 1926.
L. M. WOOD
1,603,733
LIFTING MECHANISM FOR VALVE SPRINGS
Filed Jan. 5, 1924 3 Sheets-Sheet 3
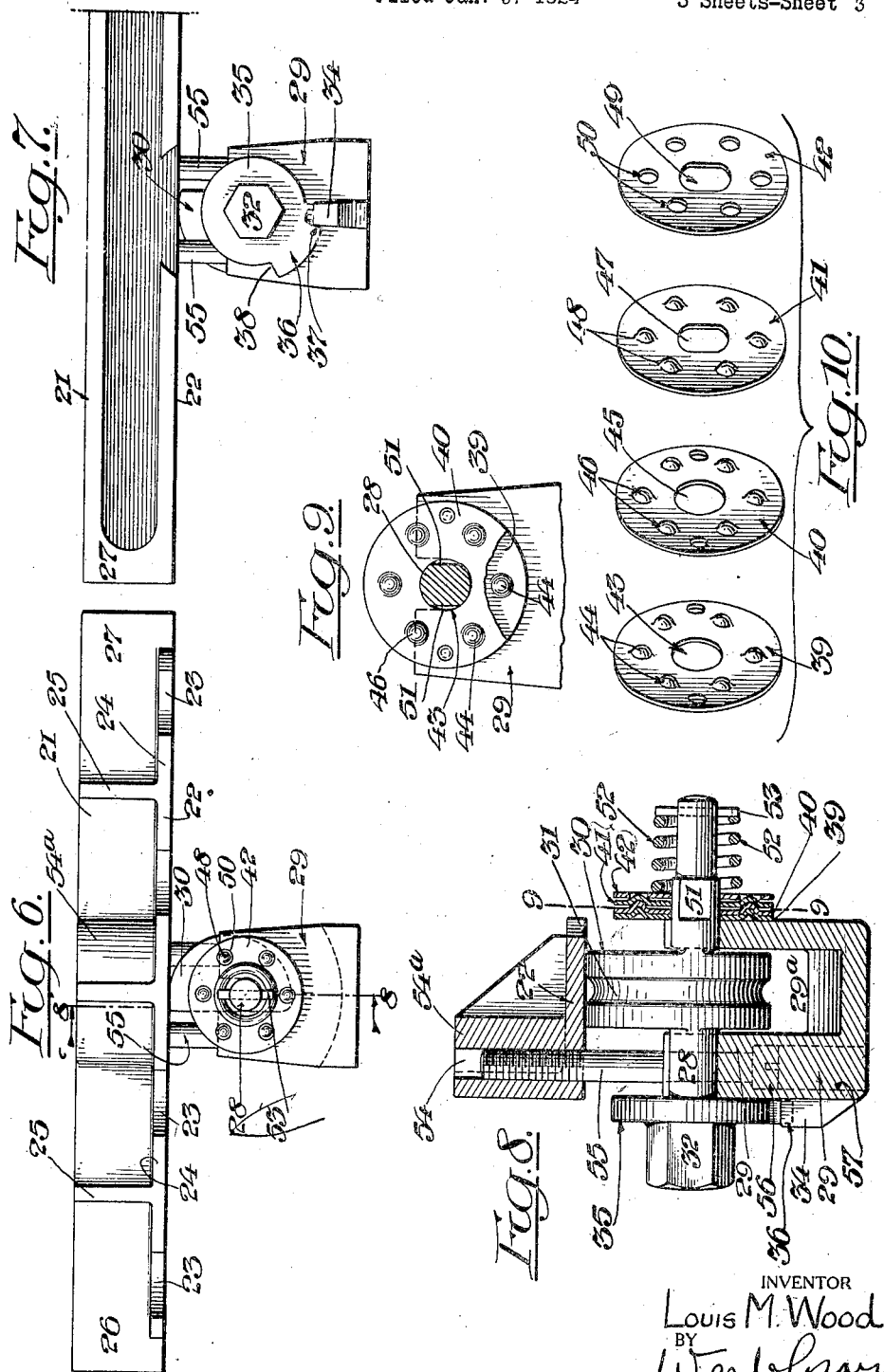
INVENTOR
Louis M. Wood
BY
Weed&Gray
ATTORNEYS Patented Oct. 19, 1926.

1,603,733

UNITED STATES PATENT OFFICE.

LOUIS MARCELLUS WOOD, OF NEW YORK, N. Y., ASSIGNOR TO SPEED-O MULTIPLE VALVE LIFTER CORPORATION, OF NEW YORK, N. Y., A CORPORATION OF NEW YORK.

LIFTING MECHANISM FOR VALVE SPRINGS.

Application filed January 5, 1924. Serial No. 684,485.

This invention relates to lifting mechanism for the valve springs of an internal combustion engine, an object of the invention being to provide an improved mechanism for elevating and maintaining a plurality of valve springs under tension so that the several valves may be removed for the purpose of grinding the same, and wherein the lifting mechanism is so constructed as to adapt it particularly for the purpose of operating against high compression valve springs without requiring the use of any considerable amount of strength in manipulating or operating the mechanism.

A further object of this invention is to provide an improved valve spring lifting mechanism which will be relatively simple and compact in construction, easy to operate, relatively cheap to manufacture, and wherein the lifting member of the mechanism is controlled by cam means adapted to be operated in a step by step manner.

A further object of this invention is to provide a valve spring lifter having a lifting member and cam means for elevating the same against a plurality of valve springs, and wherein clutch means is provided for the purpose of controlling the cam means during operation.

Figure 1:
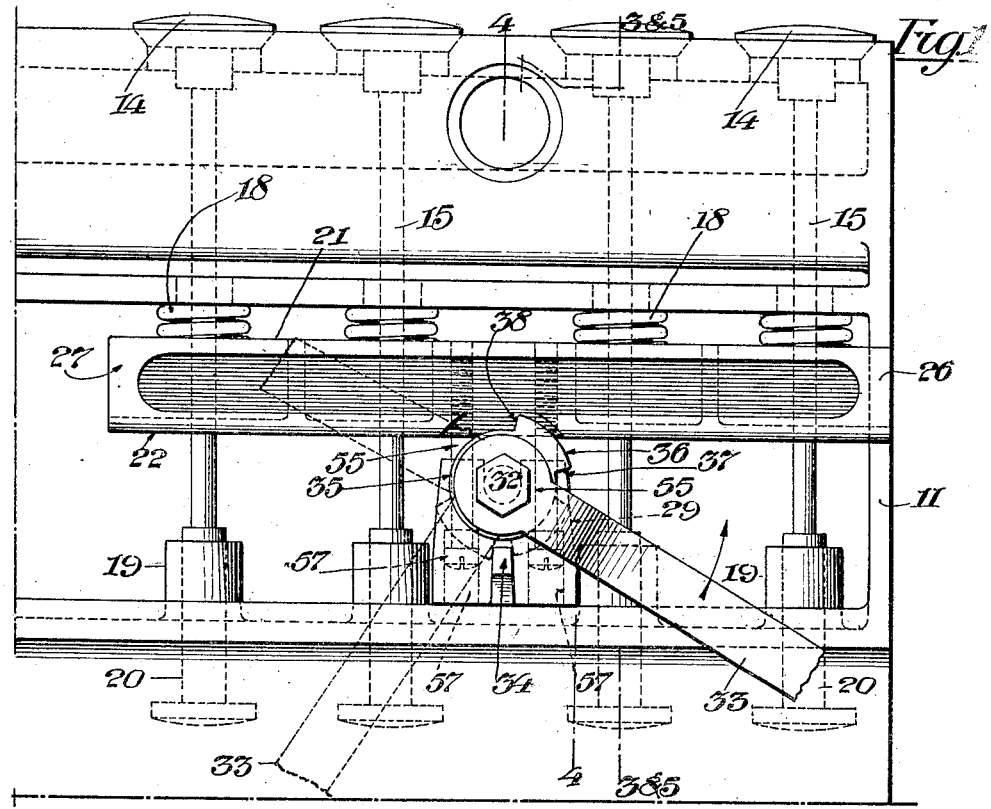
Figure 2:
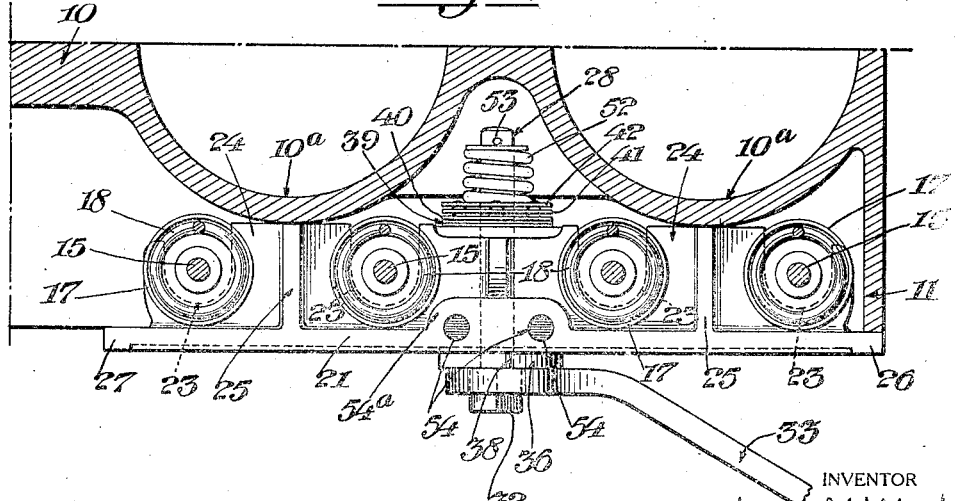

Other objects of this invention will appear in the following description and appended claims, reference being had to the accompanying drawings forming a part of this specification wherein like reference characters indicate corresponding parts in the several views and wherein Fig. 1 is a front elevation illustrating an embodiment of my invention in partially elevated position against the valve springs; Fig. 2 is a sectional plan view of the construction shown in Fig. 1; Fig. 3 is a vertical section taken substantially on line 3—3 of Fig. 1; Fig. 4 is a similar view taken on line 4—4 of Fig. 1; Fig. 5 is a similar view taken on line 5—5 of Fig. 1; Fig. 6 is a rear view of an embodiment of my invention; Fig. 7 is a fragmentary front view thereof; Fig. 8 is a vertical section taken substantially on line 8—8 of Fig. 6; Fig. 9 is a detail view illustrating a part of the clutch mechanism, and Fig. 10 is a view illustrating the several clutch disks for the clutch mechanism.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

The present improved valve spring lifting mechanism is adapted to be used in connection with various types of engines, and although one form of engine is herein illustrated by way of example, it will of course be understood that the mechanism may be employed with engines having different numbers of cylinders. It will also be understood that the form and design of the mechanism may be altered in order to adapt the mechanism to various types of engines having different forms and arrangement of parts.

In the drawings I have illustrated a present preferred form of my invention, and as shown the engine block is provided with the usual valve spring chamber 9 which is located within a housing or casing comprising rear cylinder walls 10 and forwardly extending end walls 11. The several valves 14 are provided with stems 15 which extend into the chamber 9 and adjacent to the lower ends of the valve stems are located removable pins 16 against which the valve spring retainers 17 rest when the valve springs are in normal position. The valve spring retainers 17 are constructed to receive the lower ends of valve springs 18 which are held between the retainers and the upper part of the chamber 9.

The valve spring lifter in the present instance preferably comprises an angle bar which may be readily formed from a single casting, this bar comprising a vertically extending member 21 adapted to extend longitudinally in front of the valve springs, and a horizontally extending member 22 which forms a means adapted to extend beneath the valve springs and retainers and operate thereagainst for the purpose of elevating the spring under tension. The horizontal member 22 is provided with a series of slots or recesses 23, four being shown by way of example in the present instance, which recesses are adapted to receive the valve stems and permit the retainers 17 to be seated on the member 22. Adjacent to the opposite end recesses 23 portions 24 of the horizontal member extend forwardly a sufficient distance so as to engage the curved upright walls 10ª of the cylinder casing and assist in guiding the lifting member in a vertical plane. The projecting guide portions 24 are strengthened by means of vertically extending ribs 25 which are cast integrally with the angle bar, and these ribs 25 also engage the upright walls 10ª of the cylinder casing and assist in guiding the lifting member in a vertical plane. The vertical member 21 of the angle bar is formed at opposite ends thereof with projecting guide portions 26 and 27, and it will be seen that when the present lifting member is in operative position with respect to four of the valve springs of the engine, one of the guide portions, as guide portion 26, will overlap the forward edge of a wall 11 of the valve spring chamber. Thus, where the valve lifter is utilized in connection with an engine of the type indicated, the lifting member will be guided at three points on the engine.

The lifting member 21, 22 is operated in the present instance by means of a cam which is controlled at different stages in its operation by means of clutch or gripping mechanism, the latter functioning to releasably lock or hold the cam in position at various stages or steps in its operation. The cam means of the present device comprises a suitable support or cam block 29 which is slotted transversely at the top thereof to receive and provide a bearing for a rotatable spindle 28. The cam block 29 is recessed at 29ª to provide a suitable space for a cam 30 which is fixed to the spindle 28. The cam 30 is preferably grooved at 31 centrally thereof so as to provide a pair of relatively narrow working faces at opposite sides of the groove, the purpose of the groove 31 being to separate the cam into a pair of working faces which can be more readily ground to engage uniformly the bottom surface of member 22.

At its outer end the cam supporting spindle 28 is provided with a suitable wrench receiving portion 32, and by inserting the wrench 33 over part 32, it will be seen that the cam spindle 28 may be turned or rotated for the purpose of swinging the cam 30.

The cam block 29 midway of the front face thereof is provided with a projection or lug 34, and upon the spindle 28 and located against the front face of the cam block 29 is fixedly mounted a stop member 35. This member is, in the present instance, in the form of a disk having a projection 36 extending from the periphery thereof. This projection 36 is of sufficient length so that one edge 37 thereof will engage the lug 34 as shown in Fig. 7 when the cam 30 has reached its highest position, and so that the opposite edge 38 will engage the opposite side of the lug 34 as shown in dotted lines in Fig. 1 when the cam is in its lowest position.

The cam mechanism for elevating the lifting member is provided with clutch or gripping means effective during the operation of the cam 30 to lock or hold it in different positions during the movement thereof while raising or lowering the lifting member. In the present instance, this clutch or gripping means comprises a series of four disks 39, 40, 41, and 42, which are of the same diameter and mounted upon the cam spindle 28. Disks 39 and 40, constitute one clutch member, fixed against rotation, and disks 41 and 42 constitute the other clutch member adapted to be rotated relatively to the other disks.

Referring to Fig. 10 it will be seen that the clutch disk 39 is provided with a central annular hole 43 and a series of in-pressed projections 44, six being provided in the present instance. Disk 40 is similarly provided with an annular hole 45 and corresponding projections 46. The disks 39 and 40 are placed together over the spindle 28 and against the rear face of cam block 29 with the projections 44 fitting into the recesses formed by projections 46, as shown in Fig. 8. The disks 39 and 40 are fixedly secured together and also to the cam block 29 so as to permit the spindle 28 to rotate within the alined holes 43 and 45. Clutch disk 41 is provided centrally thereof with an elongated hole 47 and a series of in-pressed projections 48 forming depressions corresponding in number and location to the projections 44 and 46, and in like manner the clutch disk 42 is provided with an elongated hole 49. Disk 42 is also formed with a series of holes 50 into which the projections 48 fit, as shown in Fig. 8. The cam spindle 28 at opposite sides thereof is flattened or slabbed-off at 51 and it will be seen that when the disks 41 and 42 are fitted over the slabbed-off portion of spindle 28, the disks 41 and 42 will be connected to the cam spindle 28 so as to rotate therewith. A coiled spring 52 is inserted over the end of spindle 28 and is held under compression between a removable pin 53 extending through a hole in the outer end of the spindle and the clutch disk 42.

The lifting member 21, 22, is connected to the cam block by means of a pair of guide pins or bolts which are effective to maintain the lifting member and cam in proper relative position at all times and also to assist in guiding the lifting member during the operation thereof.

It will be noted that in the present instance where the lifting member operates simultaneously against four valve springs, the cam 30 is located so as to operate substantially midway of the lifting member. The bar 21 substantially midway thereof is provided with an inwardly extending enlarged portion 54ª which is tapped at opposite sides thereof to provide threaded holes 54. A pair of guide bolts 55 are screwed in inverted position into the holes 54. These bolts 55 extend freely through alined holes in the cam block 29, which holes are counterbored at 57 to receive the heads 56 of the bolts. By means of the bolts 55 it will be seen that the lifting member and cam block are interlocked, but the parts may be detached by inserting a screw driver in the hole 57 and unscrewing the bolt from the lifting member. The holes 57 are bored to a sufficient depth to cause the heads 56 of the bolts to engage shoulders formed by the counterbores 57 when the cam is at its position of maximum elevation.

It will be noted that the guide bolts or pins 55 function to guide the lifting member positively in a vertical plane against oscillating movement, which might be otherwise caused by a slight difference in pressure exerted by any of the springs and also by the fact that the cam 30 will not contact at all times with the lifting member at the exact center thereof.

In the operation of the present lifting mechanism the device is placed in position so that the horizontal member 22 will extend beneath a series of four valve springs, the valve stems passing into the recesses 23 and permitting the valve spring retainers 17 to be seated around the sides of the recesses. The guide portions 24 and 25 of the lifting member will abut against the cylinder walls 10ª and one of the guide members as 26, will overlap an end wall of the casing. The wrench 33 is applied to the part 32 and by swinging the handle of the wrench in the direction of the arrow in Fig. 1, cam 30 will be turned or swung so as to engage the underside of the horizontal member 22. This cam is located in the vertical plane extending centrally through the series of springs so that in operation the lifting member will be shifted so as to exert an even pressure on all of the springs. The guide members 24, 25 and 26 assist in guiding the lifting member in a vertical plane against any tendency to move inwardly relatively to the springs.

The operation of the clutch or gripping means will be readily understood. In the present instance the cam 30 may be locked by means of the clutch in five different positions of elevation, three main positions being shown in Figs. 3, 4, and 5 and also in Fig. 1. When the cam spindle 28 is rotated disks 41 and 42 will rotate therewith relatively to disks 39 and 40, and hence projections 46 will be forced out of the depressions 48 thereby forcing disks 41 and 42 against spring 52 and increasingly placing it under compression. As the spindle 28 and disks 41 and 42 are further rotated the depressions 48 will be shifted so as to register with a different set of projections 46, and the pressure of spring 52 will force projections 46 into depressions 48, thus clutching disks 40 and 41 together and locking the cam 30 in partially elevated position. The second clutched step in the elevation of the lifting member is shown in full lines in Fig. 1 and in Fig. 4. When the lifting member is fully elevated as shown especially in Figs. 5 and 6, the stop 36 will engage lug 34 as shown in Fig. 7 and in dotted lines in Fig. 1. At this point a series of projections 46 of clutch disk 40 will be lodged in a series of depressions 48 in clutch disk 41 so that the cam will be releasably locked and held with the lifting member in full elevated position and the valve springs under compression. After the valves 14 have been removed and ground they are inserted in position again, whereupon by means of the wrench 33 the cam spindle 28 and cam 30 will be rotated in the reverse direction. As in the case of elevating the lifting member the clutch will operate to cause the lifting member to be lowered in a step by step manner, or in successive stages and at each stage the clutch will operate to releasably lock the cam.

In the present construction it will be particularly noted that the full throw of the cam and the entire lifting operation is obtained by less than a complete turn of the cam spindle, and where the pressure of the springs is very great in certain types of engines, the lifting and lowering operations are very advantageously facilitated by dividing the full throw of the cam into a series of steps at each of which the cam is locked in position against any tendency to reverse under the pressure of the springs. The clutch or gripping mechanism not only locks the cam and holds the lifting member in full elevated position but also at different stages between high and low positions. This mechanism is especially effective when lowering the lifting member under the pressure of the springs and prevents any danger of the operator inadvertently allowing the lifting member to descend suddenly and bring down the retainers 17 with force against the pins 16 and bend or shear them off, or otherwise damage the structure.

Also in types of engines where the valve stems are provided with segmental retaining keys instead of the pins 16, the gradual or step by step lowering of the cam will therefore facilitate the proper seating of the spring retainers on the retaining keys and minimize any tendency of the parts to jam or prevent the complete lowering of the springs in the event the retaining keys are accidently dislodged from the valve stems.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In a valve spring lifter, the combination of a member adapted to shift the valve springs under compression, a pair of relatively shiftable means for operating said member, and spring controlled clutch members for maintaining said means in predetermined operative position.

2. In a valve spring lifter, the combination of means adapted to operate against a plurality of valve springs for compressing the same, means for operating said means, a pair of friction clutch members for controlling said operating means, and spring means for normally maintaining said clutch members in engagement.

3. In a valve spring lifter, the combination of a lifting member, a cam support, a cam carried thereby for operating said lifting member, and cooperating clutch means carried by said cam support and cam.

4. In a valve spring lifter, the combination of a lifting member having means for operating against a plurality of valve springs, means for elevating said lifting member, and spring controlled gripping means for controlling said last means.

5. In a valve spring lifter, the combination of a lifting member, means for operating said lifting member, and cooperating clutch means for maintaining said lifting member in lifted position against the action of the valve springs and automatically releasable in either direction by shifting said operating means in either direction.

6. In a valve spring lifter, the combination of a lifting member, means located beneath said member and shiftable for elevating the same, and a pair of cooperating clutch members for controlling said means.

7. In a valve spring lifter, the combination of a lifting member comprising an angle bar having a vertical portion and a horizontal portion, shiftable cam means located beneath said angle bar and shiftable into engagement with said horizontal portion for elevating the lifting member, means for operating said cam, and frictional clutch means for releasably locking said cam in successive positions of elevation.

8. The combination of a valve spring compressing member, a cam support, a rotatable spindle carried by said support, a cam carried by said spindle for shifting said member, and clutch means carried by said spindle for maintaining said cam in operative position.

9. The combination of a valve spring compressing member, a cam support adapted to be supported beneath the valve springs, a rotatable spindle carried by said support and having a wrench receiving part, a cam carried by said spindle for shifting said member, and clutch means mounted on said spindle for maintaining said cam in operative position.

10. In a valve spring lifter, the combination of a lifting member, a supporting member adapted to be supported on the engine beneath the lifting member, a rotatable spindle carried by said supporting member and having a wrench receiving part, a cam carried by said spindle, and a rotatable clutch member mounted on said spindle at one side of said cam.

11. The combination of a valve spring lifting member, a cam support having a recess, a cam spindle journaled in said recess, a cam carried by said spindle, said support having a second recess extending transversely of said first recess and communicating therewith, and said cam being shiftable into said second recess at opposite sides of said first recess.

12. The combination of a valve spring lifting member, a supporting member adapted to be supported on the engine block, a spindle journaled in said supporting member, a cam carried by said spindle for elevating the lifting member, and a pair of relatively shiftable frictional clutch members for maintaining said cam in shifted position against the action of the valve springs, and automatically releasable in either direction upon shifting the cam in either direction.

13. In a valve spring lifter, the combination of a lifting member, cam means for operating the same, means connecting said lifting member and cam means for guiding the lifting member against oscillatory movement, and a pair of relatively shiftable frictional clutch members for maintaining said cam in shifted position against the action of the valve springs and automatically releasable in either direction by shifting the cam in either direction.

14. In a valve spring lifter, the combination of a lifting member, and means for operating the same, said lifting member having means including inwardly extending projections forming a three-point guide on the engine and means forming a two-point guide between said lifting member and said operating means.

15. A valve spring lifter comprising a lifting member terminating at opposite ends thereof in a pair of end guides, said member having means located between said guides for operating against a plurality of valve springs, and said member also having a pair of forwardly extending guides located between said end guides.

16. In a valve spring lifter, the combination of a lifting member and means for operating the same, said lifting member terminating in a pair of end guides and having intermediate said guides a pair of forwardly extending guides, said lifting member also having a pair of vertical guides to permit movement of said lifting member relatively to said operating means.

17. In a valve spring lifter, the combination of a lifting member adapted to operate against a plurality of valve springs, a cam support, a rotatable cam carried by said support, means for rotating said cam thereby to operate said lifting member, a pair of clutch disks carried one by said cam, and one by said support, said clutch disks having co-operating projections and recesses carried thereby.

18. In a valve spring lifter, the combination of a lifting member having means adapted to cooperate with a plurality of valve springs, shiftable means located beneath said lifting member for elevating the same, and means for maintaining said shiftable means in different positions during the lifting of the lifting member.

19. In a valve spring lifter, the combination of a lifting member having means adapted to cooperate with a plurality of valve springs, supporting means below said lifting member and shiftably connected thereto, rotatable means located between said supporting means and lifting member and operative to lift said lifting member relatively to its supporting means, and means for maintaining said rotatable member in different positions during the lifting of the lifting member.

20. In a valve spring lifter, the combination of a lifting member, a cam support, a rotatable cam carried thereby and adapted to engage said lifting member, a pair of co-acting stop members carried by said support and cam, and a pair of coacting clutch members carried by said support and cam.

21. In a valve spring lifter, the combination of a lifting member, a cam support, a rotatable cam carried thereby and adapted to engage said lifting member, a pair of co-acting stop members carried by said support and cam, a pair of coacting clutch members carried by said support and cam, and resilient means for maintaining said clutch members in engagement.

22. In a valve spring lifter, the combination of a lifting member, rotatable means located under said lifting member for lifting said member, means for supporting said rotatable means, a stop carried by said supporting means, and a stop carried by said rotatable means and adapted to engage opposite sides of said first stop for limiting the movement of said rotatable means in opposite directions.

Signed at New York, county and State of New York, this 26 day of December, 1923.

LOUIS MARCELLUS WOOD.